(12) United States Patent
Sato et al.

(10) Patent No.: US 8,756,916 B2
(45) Date of Patent: Jun. 24, 2014

(54) HYDRAULIC DRIVING DEVICE FOR WORKING MACHINE

(75) Inventors: Kensuke Sato, Tsuchiura (JP); Tsuyoshi Nakamura, Tsuchiura (JP); Kouji Ishikawa, Tsuchiura (JP); Yasuo Okano, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 255 days.

(21) Appl. No.: 13/443,558

(22) Filed: Apr. 10, 2012

(65) Prior Publication Data
US 2012/0260637 A1    Oct. 18, 2012

(30) Foreign Application Priority Data

Apr. 18, 2011   (JP) .................. 2011-092162

(51) Int. Cl.
*F01N 3/00* (2006.01)

(52) U.S. Cl.
USPC ............................. 60/284; 60/297

(58) Field of Classification Search
CPC ........... F01N 3/02; F01N 3/023; F01N 11/00; F01N 9/002; F01N 3/18; F15B 13/04; F15B 11/00; F02D 29/04; F02D 41/0245; F02D 41/029; F04B 49/08; E02F 9/00; E02F 9/22; E02F 9/226; E02F 9/2246; E02F 9/2282
USPC ............................. 60/487, 272–324; 701/50
See application file for complete search history.

(56) References Cited

FOREIGN PATENT DOCUMENTS

JP   3073380 B2   8/2000

*Primary Examiner* — Thomas Denion
*Assistant Examiner* — Kelsey Stanek
(74) *Attorney, Agent, or Firm* — Crowell & Moring LLP (57) ABSTRACT

A hydraulic driving device for a working machine surely prevents behavior of a single rod double acting cylinder not intended by an operator when discharge pressure of a main pump is raised to raise exhaust gas temperature to temperature required for burning particulate matter. A selector valve 160 interposed between a spool valve 61 and a rod chamber of a single rod double acting cylinder 51 and a section (a filter regeneration time actuation valve 122, a vehicle body controller 150) controlling the selector valve, are provided. A switch control section prevents a flow of oil directed from the rod chamber of the cylinder toward the spool valve by actuating the selector valve by a poppet of the selector valve when a by-pass cut valve 110 is controlled to increase a load of an engine 21 to a degree exhaust gas temperature reaches temperature required for burning particulate matter.

4 Claims, 5 Drawing Sheets

HYDRAULIC DRIVING DEVICE FOR WORKING MACHINE

BACKGROUND OF THE INVENTION

1. Field of the Invention

The present invention relates to a hydraulic driving device for a working machine including an exhaust emission control device catching particulate matter in exhaust gas generated in an engine by a filter, making the exhaust gas carry heat required for burning the particulate matter by raising the engine output in a non-operation state of the working machine, and regenerating the filter by burning the particulate matter clogging the filter.

2. Description of the Related Art

A hydraulic driving device of a hydraulic excavator which is a kind of the working machine includes an engine, a main pump (variable displacement hydraulic pump) driven by being transmitted with power of the engine, a single rod double acting cylinder driven by discharge of the main pump, and a spool valve interposed between the main pump and a hydraulic actuator. The single rod double acting cylinder includes a rod chamber formed on a rod side of a piston and a bottom chamber formed on a bottom side of a cylinder tube, and is driven by being selectively supplied with oil discharged from the main pump to the rod chamber and the bottom chamber. The spool valve can switch to a first actuating position leading the oil discharged from the main pump to the rod chamber of the single rod double acting cylinder and leading the hydraulic fluid inside the bottom chamber to a hydraulic fluid tank, a second actuating position leading the discharged oil to the bottom chamber of the single rod double acting cylinder and leading the hydraulic fluid inside the rod chamber to the hydraulic fluid tank, and a neutral position leading the discharged oil to the hydraulic fluid tank without leading it to the single rod double acting cylinder.

In an exhaust pipe leading the exhaust gas of the engine to the outside of the working machine, an exhaust emission control device catching the particulate matter in the exhaust gas generated in the engine by a filter is provided. The particulate matter caught by the filter is removed from the filter by being burnt by the heat of the exhaust gas.

It is configured that, in a non-operation state of the hydraulic excavator, that is in a state the valve position of the spool valve is held at the neutral position, the engine output is lowered to the magnitude required for the variable displacement hydraulic pump to deliver the oil with the minimum discharge pressure and the minimum discharge amount required for cooling and lubricating a hydraulic circuit.

When the engine output drops, the temperature of the exhaust gas also drops. Accompanying it, the particulate matter is hardly burnt by the heat of the exhaust gas, and the filter of the exhaust emission control device comes to be liable to be clogged. In order to prevent clogging of the filter, a hydraulic driving device of a prior art is configured that, when clogging of the filter is detected, the discharge pressure of the main pump is raised, that is the load applied to the engine is increased, with the aim of raising the engine output and the temperature of the exhaust gas is raised to the temperature required for burning the particulate matter. (Refer to Japanese Patent No. 3073380 for example.)

When the discharge pressure of the main pump is raised in order to raise the temperature of the exhaust gas to the temperature required for burning the particulate matter, there is a concern that the discharge pressure of the main pump leaks from the spool valve and the discharge pressure is transmitted to the single rod double acting cylinder although the spool valve is in a state held at the neutral position.

In the single rod double acting cylinder, the pressure receiving area of the bottom side of the cylinder tube is larger than that of the rod side of the piston. Therefore, when the pressure of the same magnitude is applied to both of the pressure receiving surface on the rod side of the piston and the pressure receiving surface on the bottom side, the force pressing the piston from the bottom side is stronger than the force pressing the piston from the rod side. As a result, the piston is pressingly moved from the bottom side, and the single rod double acting cylinder expands. Accordingly, when the discharge pressure of the main pump leaked from the spool valve is transmitted into the rod chamber and into the bottom chamber of the single rod double acting cylinder, the single rod double acting cylinder may expand although the spool valve is held at the neutral position. The expansion of the single rod double acting cylinder is not an intention of an operator which is not desirable.

BRIEF SUMMARY OF THE INVENTION

The present invention has been achieved in view of the above-mentioned circumstances, and has an object to provide a hydraulic driving device for a working machine capable of preventing expansion of a single rod double acting cylinder not intended by an operator when discharge pressure of a main pump is raised in order to raise temperature of exhaust gas to temperature required for burning particulate matter.

In order to achieve the object, the hydraulic driving device for a working machine in relation with the present invention is constituted as described below.

[1] The hydraulic driving device for a working machine in relation with the present invention includes an engine, a variable displacement hydraulic pump driven by being transmitted with power of the engine, a single rod double acting cylinder including a rod chamber formed on a rod side of a piston and a bottom chamber formed on a bottom side of a cylinder tube and driven by being selectively supplied with oil discharged from the variable displacement hydraulic pump to the rod chamber and the bottom chamber, a spool valve capable of switching to a first actuating position leading the discharged oil to the rod chamber and leading hydraulic fluid inside the bottom chamber to a hydraulic fluid tank, a second actuating position leading the discharged oil to the bottom chamber and leading hydraulic fluid inside the rod chamber to the hydraulic fluid tank, and a neutral position leading it the discharged oil to the hydraulic fluid tank without leading to the single rod double acting cylinder, an exhaust emission control device catching particulate matter in exhaust gas generated by the engine by a filter, a clogging detection section detecting clogging of the filter, a variable throttle disposed downstream of the spool valve and capable of throttling a flow of oil discharged from the hydraulic pump which passes the spool valve and is discharged to the hydraulic fluid tank, and a discharge pressure control section controlling the variable throttle, the discharge pressure control section controlling the variable throttle and to raise discharge pressure of the variable displacement hydraulic pump so that a load of the engine increases to a degree to which the temperature of exhaust gas reaches the temperature required for burning particulate matter when the valve position of the spool valve is held at the neutral position and the clogging detection section detects clogging of the filter, in which a prevention section is provided to prevent the flow of oil directed from the rod chamber of the single rod double acting cylinder toward the spool valve when the variable throttle is controlled by the discharge pressure control section so that the load of the engine increases to a degree to which the temperature of the exhaust gas reaches the temperature required for burning the particulate matter.

In the hydraulic driving device for a working machine described in [1], when the variable throttle is controlled by the discharge pressure control section so that the load of the engine increases to the degree the temperature of the exhaust gas reaches the temperature required for burning the particulate matter, the prevention section prevents the flow of the oil directed from the rod chamber of the single rod double acting cylinder toward the spool valve. Thus, even when the discharge pressure of the hydraulic pump leaked from the spool valve is transmitted to the single rod double acting cylinder, the hydraulic pressure is not discharged from the rod chamber. Accordingly, the single rod double acting cylinder does not expand by the discharge pressure of the hydraulic pump. That is, according to the hydraulic driving device for a working machine described in [1], when the discharge pressure of the main pump is raised in order to raise the temperature of the exhaust gas to the temperature required for burning the particulate matter, expansion of the single rod double acting cylinder not intended by an operator can be prevented.

[2] The hydraulic driving device for a working machine in relation with the present invention is the hydraulic driving device for a working machine according to [1], in which the prevention section includes a selector valve interposed between the spool valve and the rod chamber of the single rod double acting cylinder and a switch control section controlling the selector valve, an open position for making the spool valve and the rod chamber of the single rod double acting cylinder communicate with each other and a prevention position for preventing the flow of oil directed from the rod chamber toward the spool valve by a poppet are set as valve positions of the selector valve, and the switch control section controls the valve position of the selector valve to the prevention position in a case the variable throttle is controlled by the discharge pressure control section so that the load of the engine increases to the degree to which the temperature of the exhaust gas reaches the temperature required for burning the particulate matter and controls the valve position of the selector valve to the open position in a case other than the case.

In the prevention section of the hydraulic driving device for a working machine according to [2], when the variable throttle is controlled by the discharge pressure control section so that the load of the engine increases to the degree the temperature of the exhaust gas reaches the temperature required for burning the particulate matter, the switch control section controls the valve position of the selector valve to the prevention position. The selector valve in a state the valve position is at the prevention position surely prevents the flow of the oil directed from the rod chamber of the single rod double acting cylinder toward the spool valve by a poppet. As a result, expansion of the single rod double acting cylinder not intended by an operator can be surely prevented.

On the other hand, in a case other than the case the variable throttle is controlled by the discharge pressure control section so that the load of the engine increases to the degree the temperature of the exhaust gas reaches the temperature required for burning the particulate matter, the switch control section controls the valve position of the selector valve to the open position. The selector valve in a state the valve position is at the open position makes the spool valve and the rod chamber of the single rod double acting cylinder communicate with each other. That is, the selector valve allows discharge of the oil inside the rod chamber of the single rod double acting cylinder to the hydraulic fluid tank through the spool valve. In other words, when the valve position of the spool valve is switched to the second actuating position and the oil discharged from the main pump is supplied to the bottom chamber, the oil is discharged from the rod chamber, and the single rod double acting cylinder comes to expand.

[3] The hydraulic driving device for a working machine in relation with the present invention includes an engine, a variable displacement hydraulic pump driven by being transmitted with power of the engine, a single rod double acting cylinder including a rod chamber formed on a rod side of a piston and a bottom chamber formed on a bottom side of a cylinder tube and driven by being selectively supplied with oil discharged from the variable displacement hydraulic pump to the rod chamber and the bottom chamber, a spool valve capable of switching to a first actuating position leading the discharged oil to the rod chamber and leading hydraulic fluid inside the bottom chamber to a hydraulic fluid tank, a second actuating position leading the discharged oil to the bottom chamber and leading hydraulic fluid inside the rod chamber to the hydraulic fluid tank, and a neutral position leading the discharged oil to the hydraulic fluid tank without leading it to the single rod double acting cylinder, an exhaust emission control device catching particulate matter in exhaust gas generated by the engine by a filter, a clogging detection section detecting clogging of the filter, a variable throttle disposed downstream the spool valve and capable of throttling a flow of oil discharged from the hydraulic pump passing the spool valve and discharged to the hydraulic fluid tank, and a discharge pressure control section controlling the variable throttle, the discharge pressure control section controlling the variable throttle and raising discharge pressure of the variable displacement hydraulic pump so that a load of the engine increases to a degree temperature of exhaust gas reaches temperature required for burning particulate matter when a valve position of the spool valve is held at the neutral position and the clogging detection section detects clogging of the filter, in which a pressure discharge section is provided to make both the rod chamber and the bottom chamber of the single rod double acting cylinder communicate with the hydraulic fluid tank when the variable throttle is controlled by the discharge pressure control section so that the load of the engine increases to the degree to which the temperature of the exhaust gas reaches the temperature required for burning the particulate matter.

In the hydraulic driving device for a working machine according to [3], when the variable throttle is controlled by the discharge pressure control section so that the load of the engine increases to the degree the temperature of the exhaust gas reaches the temperature required for burning the particulate matter, the pressure discharge section makes both the rod chamber and the bottom chamber of the single rod double acting cylinder communicate with the hydraulic fluid tank. Thus, the discharge pressure of the hydraulic pump leaked from the spool valve is discharged to the hydraulic fluid tank without being transmitted to the single rod double acting cylinder. Accordingly, the single rod double acting cylinder does not expand by the discharge pressure of the hydraulic pump. That is, according to the hydraulic driving device for a working-machine described in [3], when the discharge pressure of the hydraulic pump is raised in order to raise the temperature of the exhaust gas to the temperature required for burning the particulate matter, expansion of the single rod double acting cylinder not intended by an operator can be prevented.

[4] The hydraulic driving device for a working machine in relation with the present invention is the hydraulic driving device for a working machine according to [3], in which the pressure discharge section includes a first selector valve interposed between the rod chamber of the single rod double acting cylinder and the hydraulic fluid tank, a second selector valve interposed between the bottom chamber of the single rod double acting cylinder and the hydraulic fluid tank, and a switch control section controlling the first and second selector valves, a prevention position for preventing a flow of oil directed from the rod chamber toward the hydraulic fluid tank and an open position for making the rod chamber communicate with the hydraulic fluid tank are set as valve positions of the first selector valve, a prevention position for preventing the flow of oil directed from the bottom chamber toward the hydraulic fluid tank and an open position for making the bottom chamber communicate with the hydraulic fluid tank are set as valve positions of the second selector valve, and the switch control section controls both of the valve position of the first selector valve and the valve position of the second selector valve to the open position in a case the variable throttle is controlled by the discharge pressure control section so that the load of the engine increases to the degree to which the temperature of the exhaust gas reaches the temperature required for burning the particulate matter, and controls both of the valve position of the first selector valve and the valve position of the second selector valve to the prevention position in a case other than the case.

In the pressure discharge section of the hydraulic driving device for a working machine according to [4], the switch control section controls both of the valve position of the first selector valve and the valve position of the second selector valve to the open position when the variable throttle is controlled by the discharge pressure control section so that the load of the engine increases to the degree the temperature of the exhaust gas reaches the temperature required for burning the particulate matter. The first selector valve in a state the valve position is at the open position leads the pressure inside the rod chamber of the single rod double acting cylinder to the hydraulic fluid tank not through the spool valve, and the second selector valve in a state the valve position is at the open position leads the pressure inside the bottom chamber to the hydraulic fluid tank not through the spool valve. Thus, the discharge pressure of the hydraulic pump leaked from the spool valve can be discharged to the hydraulic fluid tank without being transmitted to the single rod double acting cylinder.

On the other hand, in a case other than the case the variable throttle is controlled by the discharge pressure control section so that the load of the engine increases to the degree the temperature of the exhaust gas reaches the temperature required for burning the particulate matter, the switch control section controls both of the valve position of the first selector valve and the valve position of the second selector valve to the prevention position. The first selector valve in a state the valve position is at the prevention position does not lead the oil inside the rod chamber of the single rod double acting cylinder to the hydraulic fluid tank. The second selector valve in a state the valve position is at the prevention position does not lead the oil inside the bottom chamber of the single rod double acting cylinder to the hydraulic fluid tank. That is, when the valve position of the spool valve is switched to the first actuating position or the second actuating position, the oil discharged from the main pump is supplied to the inside of the rod chamber or to the inside of the bottom chamber of the single rod double acting cylinder through the spool valve, the oil inside the bottom chamber or inside the rod chamber is discharged to the hydraulic fluid tank through the spool valve, and the single rod double acting cylinder comes to contract or expand.

In the hydraulic driving device for a working machine according to [1] and [2], when the variable throttle is controlled by the discharge pressure control section so that the load of the engine increases to the degree the temperature of the exhaust gas reaches the temperature required for burning the particulate matter, the prevention section prevents the flow of the oil directed from the rod chamber of the single rod double acting cylinder toward the spool valve. Thus, when the discharge pressure of the main pump is raised in order to raise the temperature of the exhaust gas to the temperature required for burning the particulate matter, expansion of the single rod double acting cylinder not intended by an operator can be prevented.

In the hydraulic driving device for a working machine according to [3] and [4], when the variable throttle is controlled by the discharge pressure control section so that the load of the engine increases to the degree the temperature of the exhaust gas reaches the temperature required for burning the particulate matter, the pressure discharge section makes both the rod chamber and the bottom chamber of the single rod double acting cylinder communicate with the hydraulic fluid tank. Thus, when the discharge pressure of the main pump is raised in order to raise the temperature of the exhaust gas to the temperature required for burning the particulate matter, expansion of the single rod double acting cylinder not intended by an operator can be prevented.

BRIEF DESCRIPTION OF THE SEVERAL VIEWS OF THE DRAWING

Embodiments of the present invention will be described in detail based on the following drawings, wherein.

DETAILED DESCRIPTION OF THE EMBODIMENTS

The hydraulic driving device for a working machine in relation with the first and second embodiments of the present invention will be described.

[First Embodiment]

The hydraulic driving device for a working machine in relation with the first embodiment will be described using FIG. 1 to FIG. 4.

Figure 1:
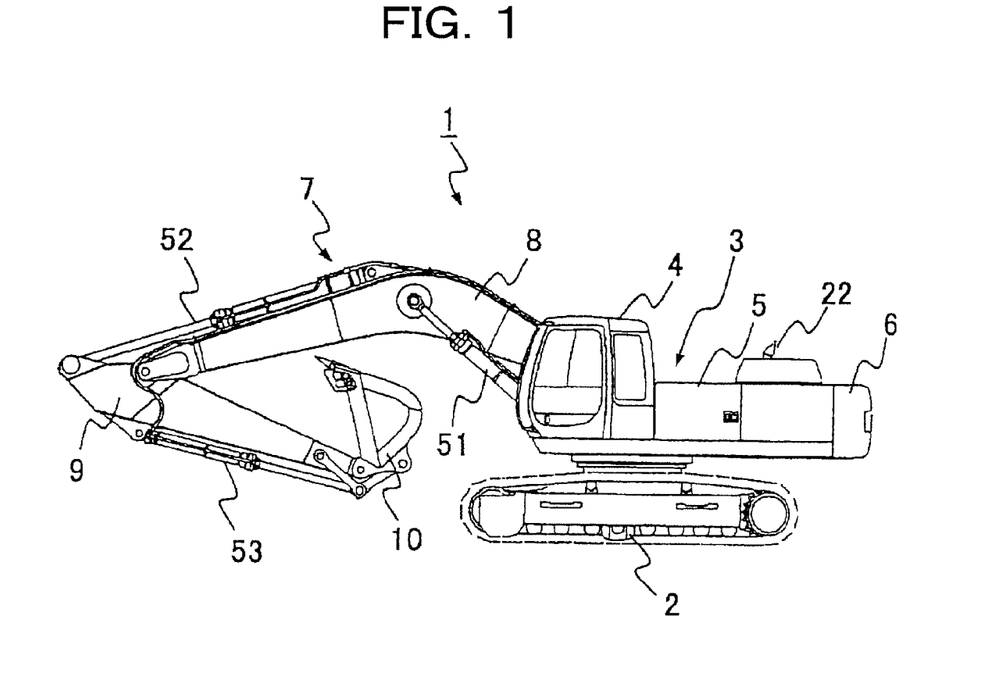
FIG. 1 is a side view of a hydraulic excavator which is a working machine applied with the present invention.

The working machine applied with the hydraulic driving device in relation with the first embodiment is a hydraulic excavator 1 shown in FIG. 1 for example. The hydraulic excavator 1 includes a traveling body 2 traveling by driving crawlers and a turning body 3 turnably connected to the upper part of the traveling body 2.

An operator cab 4 is arranged in the left front part of the turning body 3, a machine room 5 accommodating an engine 21, a first main pump 31, a second main pump 32, a pilot pump 33, and the like described below is arranged behind the operator cab 4, and a counter weight 6 constituting the rear end of the turning body 4 is arranged behind the machine room 5.

A front work apparatus 7 is furnished in a position of the turning body 3 located on the right side of the operator cab 4. The front work apparatus 7 includes a boom 8 rotatably connected to the turning body 3, an arm 9 rotatably connected to the boom 8, and a bucket 10 rotatably connected to the arm 9. These boom 8, arm 9 and bucket 10 are configured to be driven respectively by a boom cylinder 51, an arm cylinder 52 and a bucket cylinder 53 which respectively are the single rod double acting cylinders (hydraulic cylinders).

The bucket 10 is replaceable with an attachment such as a breaker (not illustrated) and the like. For driving the breaker, not only the bucket cylinder 53 but a spare cylinder 54 (shown in FIG. 2) is also used.

Figure 2:
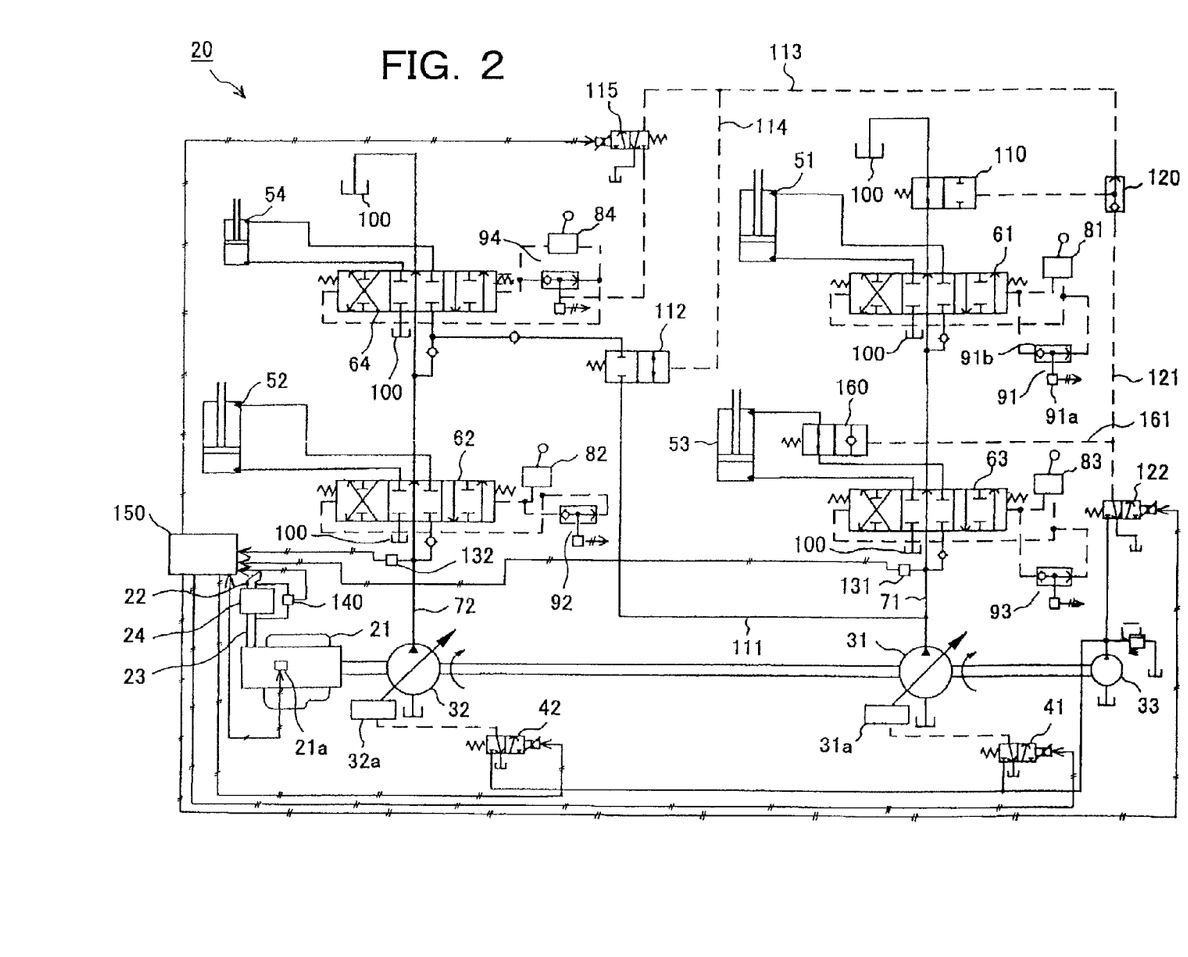
FIG. 2 is a hydraulic circuit diagram showing an essential part of a hydraulic driving device for the working machine in relation with the first embodiment of the present invention.

A hydraulic driving device 20 in relation with the first embodiment drives the front work apparatus capable of attaching the breaker instead of the bucket 10, and includes the engine 21 (diesel engine) with the amount of fuel injected electronically controlled by an engine controller 21a, the first main pump 31 (variable displacement hydraulic pump) and the second main pump 32 (variable displacement hydraulic pump) driven with the power of the engine 21 being transmitted thereto, the boom cylinder 51 driven by the oil discharged from the first main pump 31, the bucket cylinder 53 driven by the oil discharged from the first main pump 31, and the arm cylinder 52 and a spare cylinder 54 driven by the oil discharged from the second main pump 32.

The hydraulic driving device 20 further includes a first discharge flow rate control valve 41 (proportional solenoid valve) generating the pilot pressure supplied to a control piston 31a controlling a discharge flow rate of the first main pump 31 from the oil discharged from the pilot pump 33, and a second discharge flow rate control valve 42 (proportional solenoid valve) generating pilot pressure supplied to a control piston 32a controlling a discharge flow rate of the second main pump 32 from the oil discharged from the pilot pump 33.

The hydraulic driving device 20 further includes a boom control valve 61, a bucket control valve 63, an arm control valve 62, and a spare control valve 64. These control valves 61-64 are spool valves, and are 3 way valves of a hydraulic pilot type and a spring center type.

The boom control valve 61 is interposed between the boom cylinder 51 and the first main pump 31 on a first center by-pass 71 extending from the first main pump 31 to a hydraulic fluid tank 100 and can be switched to a first actuating position (the valve position on the right side of FIG. 2) leading the oil discharged from the first main pump 31 to the rod chamber of the boom cylinder 51, a second actuating position (the valve position on the left side of FIG. 2) leading the discharged oil to the bottom chamber of the boom cylinder 51, and a neutral position (the valve position in the center of FIG. 2) leading the discharged oil to the hydraulic fluid tank 100 through the first center by-pass 71 without leading it to the boom cylinder 51.

Similarly to the boom control valve 61, the bucket control valve 63 is also interposed between the bucket cylinder 53 and the first main pump 31 on the first center by-pass 71.

The arm control valve 62 is interposed between the arm cylinder 52 and the second main pump 32 on a second center by-pass 72 extending from the second main pump 32 to the hydraulic fluid tank 100 and can be switched to a first actuating position (the valve position on the right side of FIG. 2) leading the oil discharged from the second main pump 32 to the rod chamber of the arm cylinder 52, a second actuating position (the valve position on the left side of FIG. 2) leading the discharged oil to the bottom chamber of the arm cylinder 52, and a neutral position (the valve position in the center of FIG. 2) leading the discharged oil to the hydraulic fluid tank 100 through the second center by-pass 72 without leading it to the arm cylinder 52.

Similarly to the arm control valve 62, the spare control valve 64 is also interposed between the spare cylinder 54 and the second main pump 32 on the second center by-pass 72.

The hydraulic driving device 20 further includes the pilot pump 33 (fixed displacement pump) driven with the power of the engine 21 being transmitted thereto, a boom operation lever device 81, an arm operation lever device 82, a bucket operation lever device 83, and a spare operation lever device 84 generating the pilot pressure from the oil discharged from the pilot pump 33. The boom operation lever device 81 selectively generates the pilot pressure switching the valve position of the boom control valve 61 to the first actuating position and the pilot pressure switching it to the second actuating position. Similarly to the boom operation lever device 81, the arm operation lever device 82, the bucket operation lever device 83 and the spare operation lever device 84 respectively generate the pilot pressure switching the valve position of the arm control valve 62, the valve position of the bucket control valve 63, the valve position of the spare control valve 64.

For each of the boom operation lever device 81, the arm operation lever device 82, the bucket operation lever device 83, and the spare operation lever device 84, each of pilot pressure detection sections 91-94 detecting the pilot pressure outputted from the operation lever device is arranged. The pilot pressure detection section 91 includes a pilot pressure sensor 91a detecting the pressure inside a pipe line and outputting a pressure detection signal (electric signal) corresponding to the pressure, and a high pressure selecting valve 91b (high pressure priority type shuttle valve) leading the higher one out of the pilot pressure switching the valve position of the boom control valve 61 to the first actuating position and the pilot pressure switching it to the second actuating position to the pilot pressure sensor 91a. The pilot pressure detection sections 92-94 are also constituted similarly to the pilot pressure detection section 91.

Also, the hydraulic driving device 20 includes a traveling motor (hydraulic motor) driving the traveling body 2 and a turning motor (hydraulic motor) driving the turning body 3, a traveling control valve (spool valve) and a turning control valve (spool valve) arranged on the first center by-pass 71 or on the second center by-pass 72 and controlling the flow of the oil supplied from the first main pump 31 or the second main pump 32 to the hydraulic motors, a traveling operation lever device and a turning operation lever device generating the pilot pressure for operating the control valves, and pilot pressure detection section arranged for the operation lever devices, however, illustration thereof is omitted.

The hydraulic driving device 20 further includes a by-pass cut valve 110 formed of a variable throttle capable of throttling the flow of the oil discharged from the first main pump 31 discharged from the first center by-pass 71 to the hydraulic fluid tank 100 through the boom control valve 61, the bucket control valve 63 and the like, a converging pipe line 111 leading the oil discharged from the first main pump 31 to the spare control valve 64, a converging valve 112 of a hydraulic pilot type opening/closing the converging pipe line 111, a cutting pilot pipe line 113 leading the pilot pressure generated by the spare operation lever device 84 to the by-pass cut valve 110, a converging pilot pipe line 114 branching from the cutting pilot pipe line 113 and leading the pilot pressure to the converging valve 112, and a converge control valve 115 (proportional solenoid valve) controlling the pilot pressure given to each of the by-pass cut valve 110 and the converging valve 112 through each of the cutting pilot pipe line 113 and the converging pilot pipe line 114. Also, the by-pass cut valve 110 is arranged downstream of all the spool valves such as the boom control valve 61 and the bucket control valve 63 arranged on the first center by-pass 71, that is near to the hydraulic fluid tank 100.

The hydraulic driving device 20 further includes an exhaust emission control device 24 catching the particulate matter in the exhaust gas generated in the engine 21 by a filter. As shown in FIG. 1, an exhaust tube 22 is protrudingly arranged from the ceiling of the machine room 5. The exhaust tube 22 communicates with an exhaust pipe 23 extended from the engine 21 inside the machine room 5, and the filter of the exhaust emission control device 24 is arranged inside the exhaust pipe 23.

The hydraulic driving device 20 further includes a filter regeneration pilot pipe line 121 supplying the pilot pressure to the by-pass cut valve 110 in order to actuate the by-pass cut valve 110 in regenerating the filter of the exhaust emission control device 24, a filter regeneration time actuation valve 122 (proportional solenoid valve) controlling the pilot pressure given to the by-pass cut valve 110 through the filter regeneration pilot pipe line 121, and a high pressure selecting valve 120 (high pressure priority type shuttle valve) connected to the cutting pilot pipe line 113 and the filter regeneration pilot pipe line 121, selecting the higher pilot pressure out of the pilot pressure led by the pipe line 113 and the pipe line 121, and leading the selected pilot pressure to the by-pass cut valve 110. Thereby, it is configured that the higher one of the pilot pressure from the converge control valve 115 and the pilot pressure from the filter regeneration time actuation valve 122 is led to the by-pass cut valve 110.

The hydraulic driving device 20 further includes a first discharge pressure sensor 131 detecting the discharge pressure of the first main pump 31 and outputting a pressure detection signal (electric signal) corresponding to the discharge pressure, and a second discharge pressure sensor 132 detecting the discharge pressure of the second main pump 32 and outputting a pressure detection signal (electric signal) corresponding to the discharge pressure. The pressure detection signal outputted from the first discharge pressure sensor 131, the pressure detection signal outputted from the second discharge pressure sensor 132, and pressure detection signal from the respective pilot pressure detection sections 91-94 are configured to be inputted to a vehicle body controller 150.

The vehicle body controller 150 electronically controls the first discharge flow rate control valve 41, the second discharge flow rate control valve 42, the converge control valve 115, and the filter regeneration time actuation valve 122 by an arithmetic process by a CPU, a ROM and a RAM, that is, controls the drive signals given to these valves 41, 42, 115, 122.

It is configured that, when the hydraulic excavator 1 is working, the vehicle body controller 150 controls the first discharge flow rate control valve 41 and the second discharge flow rate control valve 42 based on the pressure detection signal from each of the first discharge pressure sensor 131 and the second discharge pressure sensor 132 so that the load applied to the engine 21 does not exceed the rated output of the engine 21 accompanying driving of the first main pump 31 and the second main pump 32.

It is configured that, when the breaker is in operation, the vehicle body controller 150 controls the converge control valve 115 so that the by-pass cut valve 110 and the converging valve 112 actuate by the pilot pressure generated by the spare operation lever device 84, that is, so that the converging valve 112 opens in a state the flow of the oil in the first center by-pass 71 is throttled and the oil discharged from the first main pump 31 is supplied to the spare cylinder 54.

Figure 3:
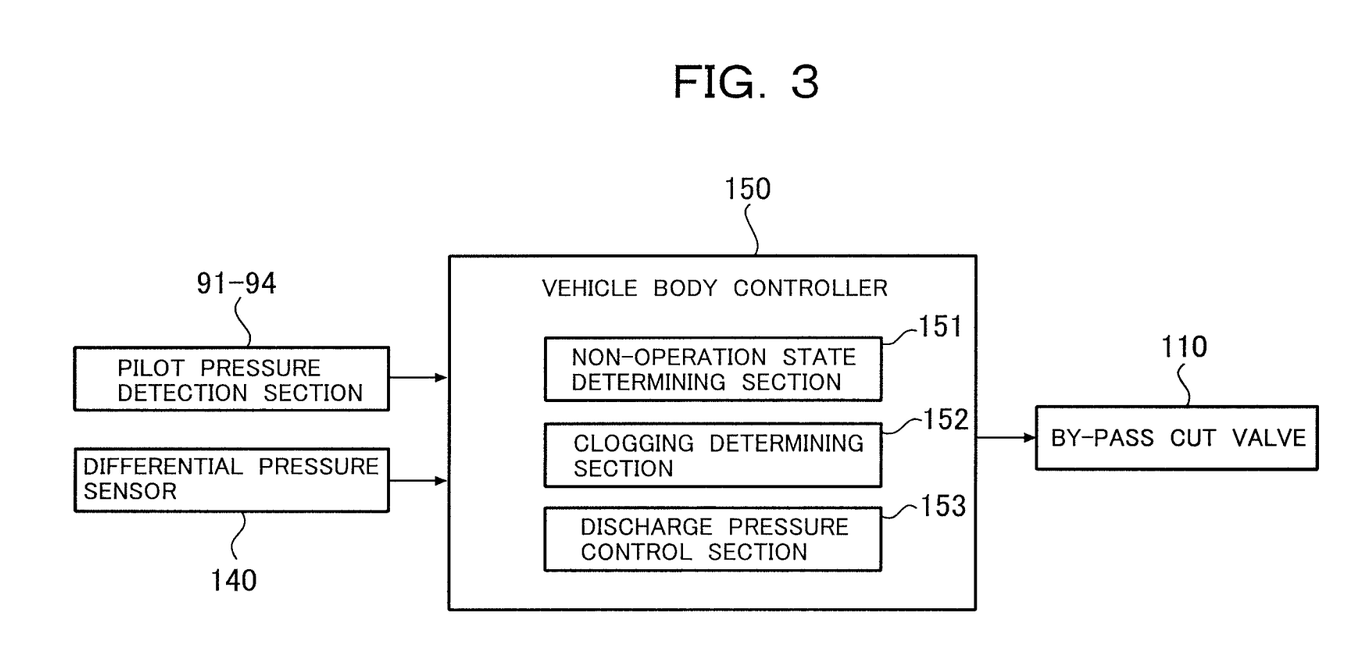
FIG. 3 is a block diagram related with control of a by-pass cut valve when a filter of an exhaust emission control device is clogged.

As shown in FIG. 3, the vehicle body controller 150 includes a non-operation state determining section 151 determining that all of the boom control valve 61, the bucket control valve 63, the arm control valve 62, the spare control valve 64, the traveling control valve, and the turning control valve are at the neutral position (normal position), that is, whether the hydraulic excavator 1 is in the non-operation state, based on the pressure detection signals from all of the pilot pressure detection sections such as the pilot pressure detection sections 91-94e. The non-operation state determining section 151 is a section set by a control program. All of the pilot pressure detection section such as the pilot pressure detection sections 91-94 and the non-operation state determining section 151 constitute a non-operation state detection section.

As shown in FIG. 2, the hydraulic driving device 20 further includes a differential pressure sensor 140 detecting the differential pressure between the upstream side and the downstream side of the filter and outputting a differential pressure detection signal (electric signal) corresponding to the differential pressure. As shown in FIG. 3, the vehicle body controller 150 includes' a clogging determining section 152 determining whether clogging has occurred in the filter based on the differential pressure detection signal from the differential pressure sensor 140. The clogging determining section 152 is a section set by a control program. The differential pressure sensor 140 and the clogging determining section 152 constitute a clogging detection section detecting clogging of the filter of the exhaust emission control device 24.

The vehicle body controller 150 further includes a discharge pressure control section 153 controlling the by-pass cut valve 110 (variable throttle) and raising the discharge pressure of the first main pump 31 so that the load of the engine increases to the degree the temperature of the exhaust gas reaches the temperature required for burning the particulate matter when the event that the valve position of all of the spool valves such as the boom control valve 61, the arm control valve 62, the bucket control valve 63 and the spare control valve 64 are in a state held at the neutral position, that is, the event that the hydraulic excavator 1 is in the non-operation state, is detected by the non-operation state detection sections (all of the pilot pressure detection sections such as the pilot pressure detection sections 91-94 and the non-operation state determining section 151) and clogging of the filter is detected by the clogging detection section (the differential pressure sensor 140 and the clogging determining section 152). The discharge pressure control section 153 is a section set by a control program.

As shown in FIG. 2, the hydraulic driving device 20 further includes a selector valve 160 formed of a 2-way valve of a hydraulic pilot type and a spring return type interposed between the bucket control valve 63 and the rod chamber of the bucket cylinder 53, and an actuation prevention pilot pipe line 161 branching from the filter regeneration pilot pipe line 121 and leading the pilot pressure to the selector valve 160. As the valve position of the selector valve 160, an open position (the valve position on the left side of FIG. 2 (normal position)) for making the bucket control valve 63 and the rod chamber of the bucket cylinder 53 communicate with each other and a prevention position (the valve position on the right side of FIG. 2 (actuation position)) for preventing the flow of the oil directed from the rod chamber toward the bucket control valve 63 by a poppet are set. It is set so that the selector valve 160 is switched from the open position to the prevention position by the pilot pressure lower than that of the by-pass cut valve 110.

The selector valve 160, the actuation prevention pilot pipe line 161 and the filter regeneration time actuation valve 122 constitute a prevention section preventing the flow of the oil directed from the rod chamber of the bucket cylinder 53 (single rod double acting cylinder) toward the bucket control valve 63 (spool valve) when the by-pass cut valve 110 (variable throttle) is controlled by the discharge pressure control section 153 through the filter regeneration time actuation valve 122. The actuation prevention pilot pipe line 161, the filter regeneration time actuation valve 122 and the discharge pressure control section 153 constitute a switch control section controlling the selector valve 160. The switch control section is set so as to control the valve position of the selector valve 160 to the prevention position (the valve position on the right side of FIG. 2) in a case the by-pass cut valve 110 is controlled by the discharge pressure control, section 153 so that the load of the engine 21 increases to the degree the temperature of the exhaust gas reaches the temperature required for burning the particulate matter, and to control the valve position of the selector valve 160 to the open position (the valve position on the left side of FIG. 2) in a case other than the case.

Figure 4:
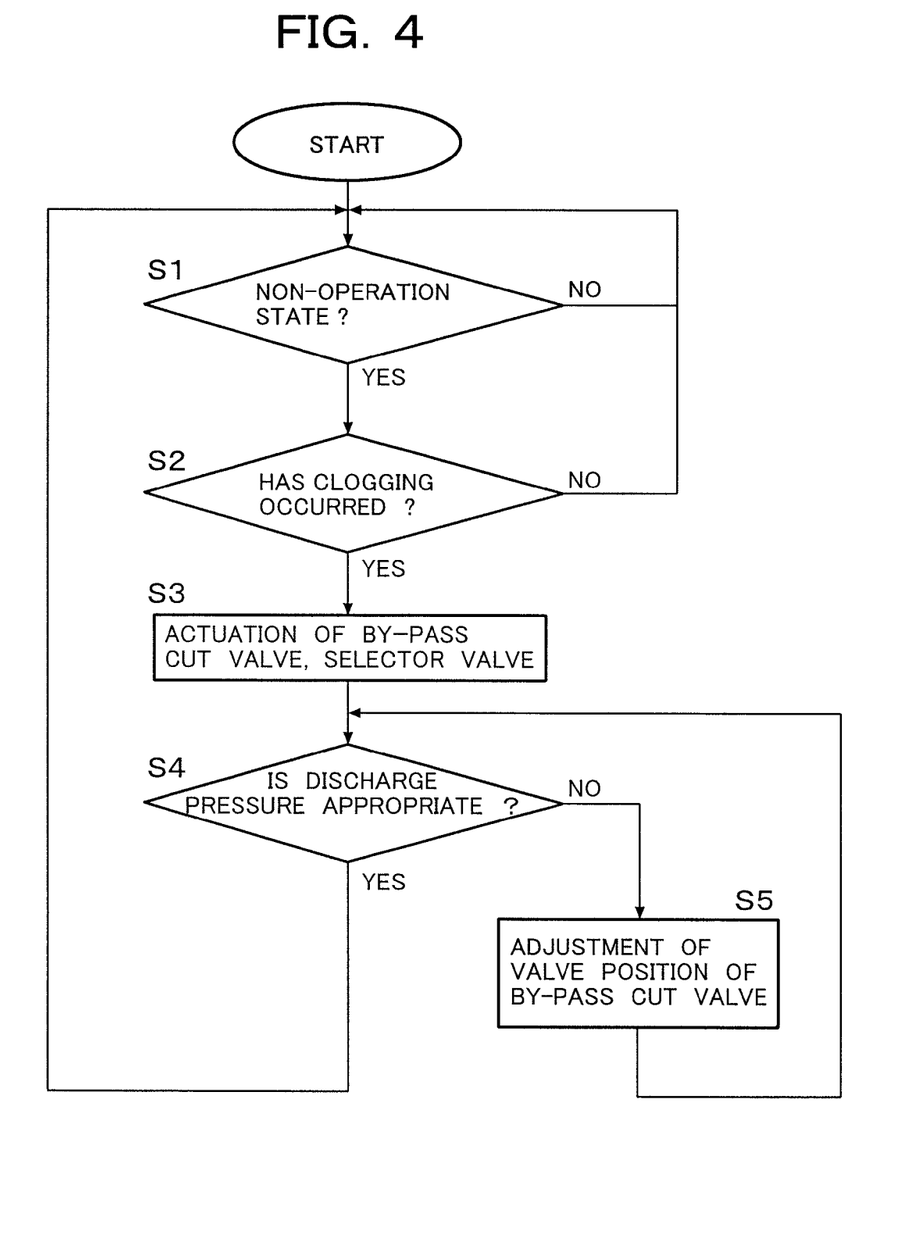
FIG. 4 is a flowchart showing an action flow when discharge pressure of a first main pump is raised so that a load of an engine increases to a degree temperature of exhaust gas reaches temperature required for burning particulate matter.

Out of the actions of the hydraulic driving device 20 in relation with the first embodiment constituted as described above, the flow of the action when the discharge pressure of the first main pump 31 is raised so that the load of the engine 21 increases to the degree the temperature of the exhaust gas reaches the temperature required for burning the particulate matter will be described using a flowchart shown in FIG. 4.

The non-operation state determining section 151 of the vehicle body controller 150 determines whether the hydraulic excavator 1 is in the non-operation state based on the pressure detection signals from all of the pilot pressure detection sections such as the pilot pressure detection sections 91-94 (Step S1). When the hydraulic excavator 1 is determined to be in the non-operation state (YES in Step S1), the clogging determining section 152 of the vehicle body controller 150 determines whether clogging has occurred in the filter of the exhaust emission control device 24 based on the differential pressure detection signal from the differential pressure sensor 140 (Step S2). When it is determined that clogging has occurred (YES in Step S2), the discharge pressure control section 153 of the vehicle body controller 150 supplies a preset drive signal to the filter regeneration time actuation valve 122 and actuates it. Thus, the filter regeneration time actuation valve 122 generates the pilot pressure from the oil discharged from the pilot pump 33, the pilot pressure is given to the by-pass cut valve 110 through the filter regeneration pilot pipe line 121 and the high pressure selecting valve 120, and, as a result, the by-pass cut valve 110 is actuated (Step S3). At the same time, the pilot pressure generated by the filter regeneration time actuation valve 122 is given to the selector valve 160 through the actuation prevention pilot pipe line 161, and thereby the valve position of the selector valve 160 is switched to the prevention position (Step S3).

As a result of actuation of the by-pass cut valve 110, the flow of the oil discharged from the first main pump 31 discharged to the hydraulic fluid tank 100 through the first center by-pass 71 is throttled, and therefore the discharge pressure of the first main pump 31 rises. The first discharge pressure sensor 131 detects the discharge pressure and outputs a pressure detection signal corresponding to the discharge pressure to the vehicle body controller 150. When the pressure detection signal is inputted to the vehicle body controller 150, the discharge pressure control section 153 determines whether the discharge pressure of the first main pump 31 is appropriate, or is an appropriate pressure preset intending to increase the load of the engine to the degree the temperature of the exhaust gas reaches the temperature required for burning the particulate matter, based on the pressure detection signal (Step S4). When the discharge pressure of the first main pump 31 is determined to be appropriate, the routine returns to Step S1, and the routine of "Step S1→Step S2→Step S3→Step S4" is repeated while the hydraulic excavator 1 is in the non-operation state and until the clogging of the filter is dissolved.

In Step 4, when the discharge pressure of the first main pump 31 is not appropriate (NO in Step S4), the discharge pressure control section 153 adjusts the throttle amount of the first center by-pass 71 to a magnitude capable of obtaining an appropriate pressure by adjusting the drive signal supplied to the filter regeneration time actuation valve 122, that is, by adjusting the pilot pressure given from the filter regeneration time actuation valve 122 to the by-pass cut valve 110 (Step S5). Adjustment of the discharge pressure of the first main pump 31 is repeated until the discharge pressure becomes the appropriate pressure (repetition of "Step S5→Step S4→Step S5"). Also, when the discharge pressure of the first main pump 31 becomes the appropriate pressure (YES in Step S4), the routine returns to Step S1, and the routine of "Step S1→Step S2→Step S3→Step S4" is repeated while the hydraulic excavator 1 is in the non-operation state and until the clogging of the filter is dissolved.

While the first main pump 31 is held to a state the discharge pressure has risen by actuation of the by-pass cut valve 110, the valve position of the bucket control valve 63 is at the neutral position, however because the bucket control valve 63 is a spool valve, the discharge pressure of the first main pump 31 may leak from the bucket control valve 63 to the bucket cylinder 53 side. When leaked, the discharge pressure of the first main pump 31 is transmitted to the inside of the rod chamber and the inside of the bottom chamber of the bucket cylinder 53, and thereby the piston of, the bucket cylinder 53 comes to be pressed from the bottom side. However, because the poppet of the selector valve 160 prevents the flow of the oil directed from the rod chamber of the bucket cylinder 53 toward the bucket control valve 63, the oil is not discharged from the rod chamber, and therefore the bucket cylinder 53 does not expand.

On the other hand, in a case other than that the by-pass cut valve 110 is controlled by the discharge pressure control section 153 so that the load of the engine 21 increases to the degree the temperature of the exhaust gas reaches the temperature required for burning the particulate matter, the switch control section (the actuation prevention pilot pipe line 161, the filter regeneration time actuation valve 122, the discharge pressure control section 153) controls the valve position of the selector valve 160 to the open position (the valve position on the left side of FIG. 2). The selector valve 160 in a state the valve position is at the open position makes the bucket control valve 63 and the rod chamber of the bucket cylinder 53 communicate with each other. That is, discharge of the oil inside the bucket cylinder 53 to the hydraulic fluid tank 100 through the bucket control valve 63 is allowed. In other words, when the valve position of the bucket control valve 63 is switched to the second actuating position and the oil discharged from the first main pump 31 is supplied to the bottom chamber, the oil is discharged from the rod chamber, and the bucket cylinder 53 comes to expand.

According to the hydraulic driving device 20 in relation with the first embodiment, following effects can be secured.

In the hydraulic driving device 20 in relation with the first embodiment, when the by-pass cut valve 110 (variable throttle) is controlled by the discharge pressure control section 153 of the vehicle body controller 150 so that the load of the engine 21 increases to the degree the temperature of the exhaust gas reaches the temperature required for burning the particulate matter, the prevention section (the selector valve 160, the actuation prevention pilot pipe line 161, the filter regeneration time actuation valve 122) prevents the flow of the oil directed from the rod chamber of the bucket cylinder 53 (single rod double acting cylinder) toward the bucket control valve 63 (spool valve). Thus, even when the discharge pressure of the first main pump 31 leaked from the bucket control valve 63 is transmitted to the inside of the rod chamber and the inside of the bottom chamber of the bucket cylinder 53 and the piston of the bucket cylinder 53 is pressed from the bottom side accompanying it, the oil is not discharged from the rod chamber and the bucket cylinder 53 does not expand. That is, according to the hydraulic driving device 20 in relation with the first embodiment, when the discharge pressure of the first main pump 31 is raised in order to raise the temperature of the exhaust gas to the temperature required for burning the particulate matter, expansion of the bucket cylinder 53 not intended by an operator can be surely prevented.

In the hydraulic driving device 20 in relation with the first embodiment, the by-pass cut valve 110 intrinsically is a variable throttle used when the oil discharged from the first main pump 31 is supplied to the spare cylinder 54, and is not a variable throttle newly added with the aim of raising the discharge pressure of the first main pump 31 so that the load of the engine 21 increases to the degree the temperature of the exhaust gas reaches the temperature required for burning the particulate matter. That is, the hydraulic driving device 20 in relation with the first embodiment can raise the discharge pressure of the first main pump 31 by diverting the existing variable throttle. Accordingly, increase of the number of the parts newly added with the aim of raising the discharge pressure of the first main pump 31 can be suppressed.

Also, in the hydraulic driving device 20 in relation with the first embodiment described above, the selector valve 160 is arranged only for the bucket cylinder 53; however it is also possible that the selector valve 160 is arranged for the boom cylinder 51, and the boom cylinder 51 is configured to be prevented from expanding. Further, depending on a hydraulic driving device, there is a case that the arm control valve is arranged on the first center by-pass also. In such a case, it may also be configured that the selector valve 160 is arranged for the arm cylinder also and expansion of the arm cylinder 52 is prevented. Further, based on a relation between gravity applied to each portion of the front work apparatus 7 (the boom, arm, bucket and the like) in the non-operation state and the degree of raising the discharge pressure of the first main pump 31, the selector valve 160 may be arranged for any or all of the boom cylinder 51, the arm cylinder 52 and the bucket cylinder 53 according to the necessity.

[Second Embodiment]

The hydraulic driving device for a working machine in relation with the second embodiment will be described using FIG. 5.

Figure 5:
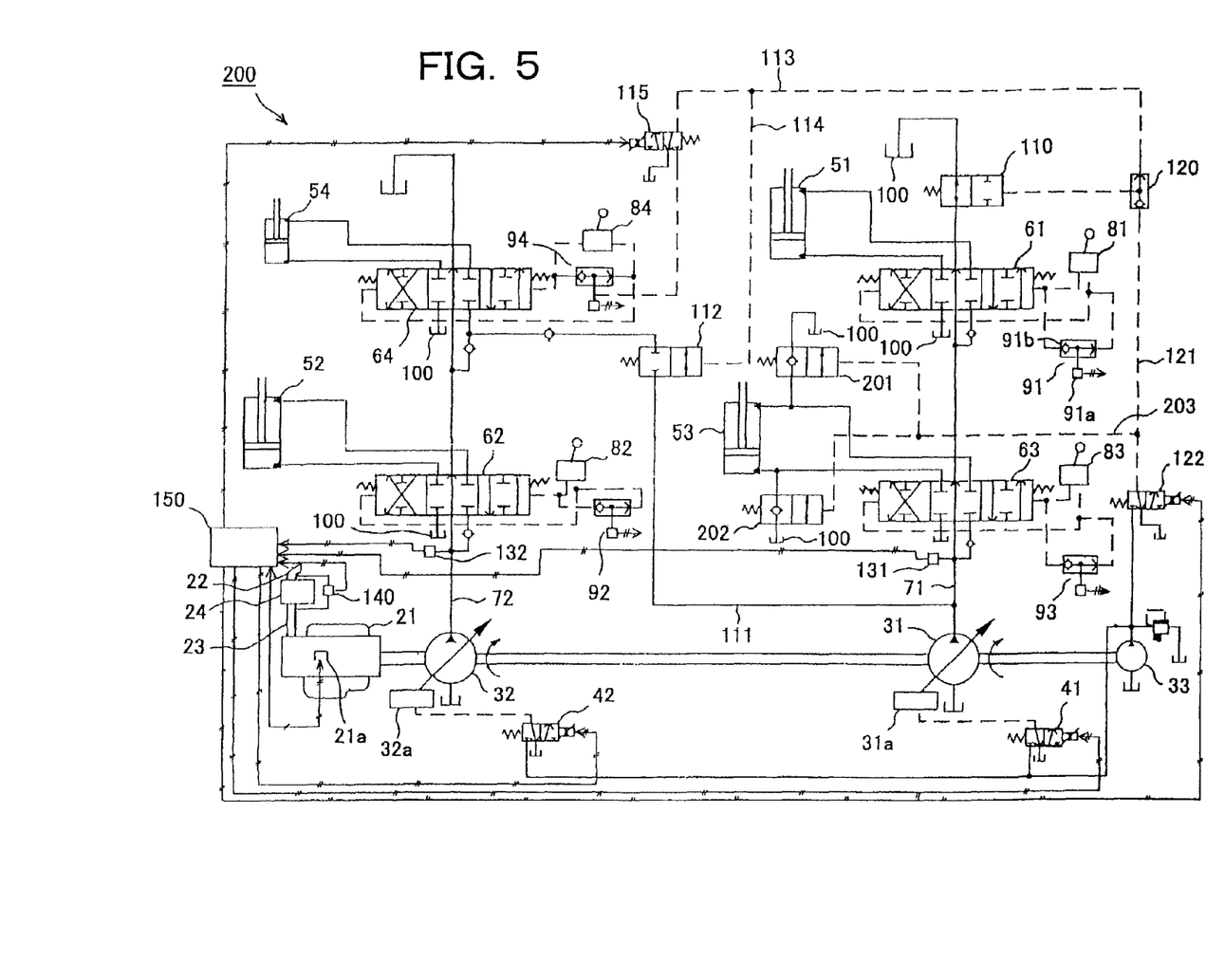
FIG. 5 is a hydraulic circuit diagram showing an essential part of the hydraulic driving device for a working machine in relation with a second embodiment of the present invention.

Instead of the selector valve 160 in the hydraulic driving device 20 in relation with the first embodiment, a hydraulic driving device 200 in relation with the second embodiment shown in FIG. 5 includes a first selector valve 201 interposed between the rod chamber of the bucket cylinder 53 (single rod double acting cylinder) and the hydraulic fluid tank 100, a second selector valve 202 interposed between the bottom chamber of the bucket cylinder 53 and the hydraulic fluid tank 100, and an actuation prevention pilot pipe line 203 branching from the filter regeneration pilot pipe line 121, divided further into two, and leading the pilot pressure to the first selector valve 201 and the second selector valve 202.

Both of the first selector valve 201 and the second selector valve 202 are 2-way valves of a hydraulic pilot type and a spring return type. As the valve position of the first selector valve 201, the prevention position (the valve position on the left side of FIG. 5 (normal position)) for preventing the flow of the oil directed from the rod chamber of the bucket cylinder 53 toward the hydraulic fluid tank 100 not through the bucket control valve 63 by a poppet and the open position (the valve position on the right side of FIG. 5 (actuating position)) for making the rod chamber of the bucket cylinder 53 communicate with the hydraulic fluid tank 100 not through the bucket control valve 63 are set. As the valve position of the second selector valve 202, the prevention position (the valve position on the left side of FIG. 5 (normal position)) for preventing the flow of the oil directed from the bottom chamber of the bucket cylinder 53 toward the hydraulic fluid tank 100 not through the bucket control valve 63 by a poppet and the open-position (the valve position on the right side of FIG. 5 (actuating position)) for making the bottom chamber of the bucket cylinder 53 communicate with the hydraulic fluid tank 100 not through the bucket control valve 63 are set.

The first selector valve 201, the second selector valve 202, the actuation prevention pilot pipe line 203 and the filter regeneration time actuation valve 122 constitute a pressure discharge section making both the rod Chamber and the bottom chamber of the bucket cylinder 53 (single rod double acting cylinder) communicate with the hydraulic fluid tank 100 when the by-pass cut valve 110 (variable throttle) is controlled by the discharge pressure control section 153 of the vehicle body controller 150 through the filter regeneration time actuation valve 122. The actuation prevention pilot pipe line 203, the filter regeneration time actuation valve 122 and the discharge pressure control section 153 constitute a switch control section controlling the first selector valve 201 and the second selector valve 202. The switch control section is set so as to control both of the valve position of the first selector valve 201 and the valve position of the second selector valve 202 to the open position (the valve position on the right side of FIG. 5 (actuating position)) when the by-pass cut valve 110 (variable throttle) is controlled by the discharge pressure control section 153 through the filter regeneration time actuation valve 122 so that the load of the engine 21 increases to the degree the temperature of the exhaust gas reaches the temperature required for burning the particulate matter, and to control both of the valve position of the first selector valve 201 and the valve position of the second selector valve 202 to the prevention position (the valve position on the left side of FIG. 5 (normal position)) in a case other than the case.

In the hydraulic driving device 200 in relation with the second embodiment, the constitution other than the above is same with the constitution of the hydraulic driving device 20 in relation with the first embodiment.

In the hydraulic driving device 200 in relation with the second embodiment thus constituted, when the filter regeneration time actuation valve 122 generates the pilot pressure from the oil discharged from the pilot pump 33, the pilot pressure is given to the by-pass cut valve 110 through the filter regeneration pilot pipe line 121 and the high pressure selecting valve 120, and is given to the first selector valve 201 and the second selector valve 202 through the actuation prevention pilot pipe line 203. Thus, actuation of the by-pass cut valve 110 and switching of both of the valve position of the first selector valve 201 and the valve position of the second selector valve 202 to the open position (the valve position on the right side of FIG. 5) are performed simultaneously.

While the first main pump 31 is held to a state the discharge pressure has risen by actuation of the by-pass cut valve 110, the first selector valve 201 discharges the oil inside the rod chamber of the bucket cylinder 53 to the hydraulic fluid tank 100 not through the bucket control valve 63, and the second selector valve 202 discharges the oil inside the bottom chamber of the bucket cylinder 53 to the hydraulic fluid tank 100 not through the bucket control valve 63. Accordingly, even when the discharge pressure of the first main pump 31 leaks from the bucket control valve 63 to the bucket cylinder 53 side, the discharge pressure is discharged to the hydraulic fluid tank 100 without being transmitted to the bucket cylinder 53, and therefore the bucket cylinder 53 does not expand.

On the other hand, in a case other than that the by-pass cut valve 110 is controlled by the discharge pressure control section 153 so that the load of the engine 21 increases to the degree the temperature of the exhaust gas reaches the temperature required for burning the particulate matter, the switch Control section (the actuation prevention pilot pipe line 203, the filter regeneration time actuation valve 122 and the discharge pressure control section 153) controls both of the valve position of the first selector valve 201 and the valve position of the second selector valve 202 to the prevention position (the valve position on the left side of FIG. 5). The first selector valve 201 in a state the valve position is at the prevention position does not lead the oil inside the rod chamber of the bucket cylinder 53 to the hydraulic fluid tank 100. Also, the second selector valve 202 in a state the valve position is at the prevention position does not lead the oil inside the bottom chamber of the bucket cylinder 53 to the hydraulic fluid tank 100. That is, when the valve position of the bucket control valve 63 is switched to the first actuating position or the second actuating position, the oil discharged from the first main pump 31 is supplied to the inside of the rod chamber or the inside of the bottom chamber of the bucket cylinder 53 through the bucket control valve 63, the oil inside of the bottom chamber or the inside of the rod chamber is discharged to the hydraulic fluid tank 100 through the bucket control valve 63, and the bucket cylinder 53 comes to contract or expand.

Also, in the hydraulic driving device 200 in relation with the second embodiment, when both of the valve position of the first selector valve 201 and the valve position of the second selector valve 202 are switched to the open position and if an external force is applied to the bucket cylinder 53, pressure is not generated inside the bucket cylinder 53, and therefore the operator should ground the front work apparatus 7 so that the bucket cylinder 53 does not contract or expand by the gravity of the bucket 10.

According to the hydraulic driving device 200 in relation with the second embodiment, following effects can be secured.

In the hydraulic driving device 200 in relation with the second embodiment, when the by-pass cut valve 110 (variable throttle) is controlled by the discharge pressure control section so that the load of the engine 21 increases to the degree the temperature of the exhaust gas reaches the temperature required for burning the particulate matter, the pressure discharge section (the first selector valve 201, the second selector valve 202, the actuation prevention pilot pipe line 203, the filter regeneration time actuation valve 122) makes both of the rod chamber and the bottom chamber of the bucket cylinder 53 (single rod double acting cylinder) communicate with the hydraulic fluid tank 100. Thus, the discharge pressure of the first main pump 31 leaked from the bucket control valve 63 (spool valve) is discharged to the hydraulic fluid tank 100 without being transmitted to the inside of the rod chamber and the inside of the bottom chamber of the bucket cylinder 53. Accordingly, the bucket cylinder 53 does not expand by the discharge pressure of the first main pump 31. That is, according to the hydraulic driving device 200, when the discharge pressure of the first main pump 31 is raised in order to raise the temperature of the exhaust gas to the temperature required for burning the particulate matter, expansion of the bucket cylinder 53 not intended by an operator can be surely prevented.

Similarly to the hydraulic driving device 20 in relation with the first embodiment, the hydraulic driving device 200 in relation with the second embodiment also can raise the discharge pressure of the first main pump 31 by diverting the existing variable throttle. Accordingly, increase of the number of the parts newly added with the aim of raising the discharge pressure of the first main pump 31 can be suppressed.

What is claimed is:

1. A hydraulic driving device for a working machine comprising:
    an engine;
    a variable displacement hydraulic pump driven by being transmitted with power of the engine;
    a single rod double acting cylinder including a rod chamber formed on a rod side of a piston and a bottom chamber formed on a bottom side of a cylinder tube, and driven by being selectively supplied with oil discharged from the variable displacement hydraulic pump to the rod chamber and the bottom chamber;
    a spool valve capable of switching to a first actuating position leading the discharged oil to the rod chamber and leading hydraulic fluid inside the bottom chamber to a hydraulic fluid tank, a second actuating position leading the discharged oil to the bottom chamber and leading hydraulic fluid inside the rod chamber to the hydraulic fluid tank, and a neutral position leading the discharged oil to the hydraulic fluid tank without leading it to the single rod double acting cylinder;
    an exhaust emission control device catching particulate matter in exhaust gas generated by the engine by a filter;
    a clogging detection section detecting clogging of the filter;
    a variable throttle disposed downstream of the spool valve and capable of throttling a flow of oil discharged from the hydraulic pump which passes through the spool valve and is discharged to the hydraulic fluid tank; and
    a discharge pressure control section controlling the variable throttle,
    the discharge pressure control section controlling the variable throttle to raise discharge pressure of the variable displacement hydraulic pump so that a load of the engine increases to a degree to which temperature of exhaust gas reaches temperature required for burning particulate matter when a valve position of the spool valve is held at the neutral position and the clogging detection section detects clogging of the filter,
    wherein a prevention section is provided to prevent the flow of oil directed from the rod chamber of the single rod double acting cylinder toward the spool valve when the variable throttle is controlled by the discharge pressure control section so that the load of the engine increases to the degree to which the temperature of the exhaust gas reaches the temperature required for burning the particulate matter.

2. The hydraulic driving device for a working machine according to claim 1, wherein:

the prevention section includes a selector valve interposed between the spool valve and the rod chamber of the single rod double acting cylinder and a switch control section controlling the selector valve;

an open position for making the spool valve and the rod chamber of the single rod double acting cylinder communicate with each other and a prevention position for preventing the flow of oil directed from the rod chamber toward the spool valve by a poppet are set as valve positions of the selector valve; and the switch control section, in a case the variable throttle is controlled by the discharge pressure control section so that the load of the engine increases to the degree to which the temperature of the exhaust gas reaches the temperature required for burning the particulate matter, controls the valve position of the selector valve to the prevention position and, in a case other than the case, controls the valve position of the selector valve to the open position.

3. A hydraulic driving device for a working machine comprising:

an engine;

a variable displacement hydraulic pump driven by being transmitted with power of the engine;

a single rod double acting cylinder including a rod chamber formed on a rod side of a piston and a bottom chamber formed on a bottom side of a cylinder tube and driven by being selectively supplied with oil discharged from the variable displacement hydraulic pump to the rod chamber and the bottom chamber;

a spool valve capable of switching to a first actuating position leading the discharged oil to the rod chamber and leading hydraulic fluid inside the bottom chamber to a hydraulic fluid tank, a second actuating position leading the discharged oil to the bottom chamber and leading hydraulic fluid inside the rod chamber to the hydraulic fluid tank, and a neutral position leading the discharged oil to the hydraulic fluid tank without leading it to the single rod double acting cylinder;

an exhaust emission control device catching particulate matter in exhaust gas generated by the engine by a filter;

a clogging detection section detecting clogging of the filter;

a variable throttle disposed downstream the spool valve and capable of throttling a flow of oil discharged from the hydraulic pump passing the spool valve and discharged to the hydraulic fluid tank; and a discharge pressure control section controlling the variable throttle, the discharge pressure control section controlling the variable throttle and raising discharge pressure of the variable displacement hydraulic pump so that a load of the engine increases to a degree temperature of exhaust gas reaches temperature required for burning particulate matter when a valve position of the spool valve is held at the neutral position and the clogging detection section detects clogging of the filter, wherein a pressure discharge section is provided to make both the rod chamber and the bottom chamber of the single rod double acting cylinder communicate with the hydraulic fluid tank when the variable throttle is controlled by the discharge pressure control section so that the load of the engine increases to the degree to which the temperature of the exhaust gas reaches the temperature required for burning the particulate matter.

4. The hydraulic driving device for a working machine according to claim 3, wherein:

the pressure discharge section includes a first selector valve interposed between the rod chamber of the single rod double acting cylinder and the hydraulic fluid tank, a second selector valve interposed between the bottom chamber of the single rod double acting cylinder and the hydraulic fluid tank, and a switch control section controlling the first and second selector valves;

a prevention position for preventing a flow of oil directed from the rod chamber toward the hydraulic fluid tank and an open position for making the rod chamber communicate with the hydraulic fluid tank are set as valve positions of the first selector valve;

a prevention position for preventing the flow of oil directed from the bottom chamber toward the hydraulic fluid tank and an open position for making the bottom chamber communicate with the hydraulic fluid tank are set as valve positions of the second selector valve; and the switch control section, in a case the variable throttle is controlled by the discharge pressure control section so that the load of the engine increases to the degree to which the temperature of the exhaust gas reaches the temperature required for burning the particulate matter, controls both of the valve position of the first selector valve and the second selector valve to the open position, and in a case other than the case, controls both of the valve position of the first selector valve and the second selector valve to the prevention position.

* * * * *